United States Patent Office 3,214,892
Patented Nov. 2, 1965

3,214,892
PROCESS FOR SELECTIVELY ABSORBING CARBON DIOXIDE WITH ETHYLENE CARBONATE
Orrin C. Holbrook, Crystal Lake, Ill., assignor to The Pure Oil Company, Chicago, Ill., a corporation of Ohio
No Drawing. Filed Jan. 5, 1962, Ser. No. 164,588
9 Claims. (Cl. 55—68)

This invention relates to a selective solvent for removing acid gases from admixtures with non-acidic constituents and to an improved process for the removal of acid gases from a gaseous mixture containing hydrocarbons and/or other non-acidic constituents by the use of a selective solvent consisting of ethylene carbonate or a solution of ethylene carbonate.

The acid gas content of natural gases varies between broad limits, depending on the field from which it was produced. Natural gases produced from some subterranean reservoirs contain undesirably high concentrations of acid gases such as carbon dioxide and hydrogen sulfide. Before these gases can be sold, it is necessary that the high concentration of acid gases be removed or at least reduced to an acceptable concentration. Various methods of removing acid gases from natural gas have been proposed and are being used. Since acid gases such as carbon dioxide and hydrogen sulfide are chemically reactive while the hydrocarbon gases are relatively inert, one method of removing the acid gases from mixtures containing same is the utilization of compounds which react with the acid gases. For example, sodium carbonate and triethanolamine have been proposed for removing carbon dioxide from natural gas. It has also been proposed to remove acid gases from gaseous mixtures by the utilization of solvents which have a selective solubility for the acid gases. Selective solvents currently used commercially in acid-gas removal processes are water, methyl alcohol, and propylene carbonate. The selectivity of water for acid gas is excellent, but its capacity is very low, thereby requiring high circulation rates and large tower sizes in the water-wash process. At ambient temperature, the capacity of methyl alcohol is high but its selectivity is very poor. Propylene carbonate extraction is the most economical method of removing carbon dioxide from methane since its capacity for acid gas is high and its selectivity for extracting carbon dioxide from methane is excellent. However, its selectivity decreases rapidly as the molecular weight of the hydrocarbon increases. In removing carbon dioxide from wet gases, the propylene carbonate process would result in prohibitive loss of ethane and heavier hydrocarbons. Inasmuch as the propylene carbonate process is suitable for use in only very "dry" gas, i.e., gas having a low content of ethane and higher-molecular-weight hydrocarbons, its usefulness is restricted to the removal of carbon dioxide from natural gases produced from only a small percentage of existing fields.

In accordance with this invention, I have found that a selective solvent consisting of ethylene carbonate, or a solution of ethylene carbonate, is superior to propylene carbonate with respect to selectivity in removing carbon dioxide from gaseous mixtures containing significant amounts of ethane and heavier hydrocarbons.

It is therefore a primary object of this invention to provide a process for removing acid gases from gaseous mixtures.

Another object of this invention to provide a selective solvent for removing carbon dioxide from a hydrocarbon gas mixture containing same.

Another object of this invention to provide a process for removing carbon dioxide from natural gas containing significant amounts of ethane and heavier hydrocarbons.

Another object of this invention to provide a process for the recovery of carbon dioxide from gaseous mixtures utilizing a superior selective solvent consisting of ethylene carbonate, or a solution of ethylene carbonate in an inert solvent.

Another object of this invention is to provide a process for enhancing the ability of propylene carbonate to reject ethane and heavier hydrocarbon gases when utilized for removing carbon dioxide from hydrocarbon-containing gaseous mixtures.

These and further objects of this invention will become apparent as the description proceeds.

In carrying out the process of this invention, acid gas is removed from a gaseous mixture containing same by passing the gaseous mixture through an absorption zone in which it is contacted with solvent consisting of ethylene carbonate or a solution of ethylene carbonate in an inert solvent. The spent solvent is then withdrawn from the absorption zone and passed through a regeneration zone where the absorbed acid gases are removed by flashing and/or stripping. The regenerated solvent can then be recycled back to the absorption zone for further use.

One method of carrying out the process of this invention is to maintain proper temperature control throughout the entire process in order to provide operating temperatures in excess of the melting point of ethylene carbonate, 36.2° C. However, since ethylene carbonate extraction is most economical if carried out at ambient temperatures, it is preferred that the ethylene carbonate be dissolved in an inert solvent. The inert solvent is defined as one which is unreactive toward the ethylene carbonate and other solvent constituents, and the acid constituents of the gas. The amount of the solvent used should be no greater than that required to assure the complete solubility of ethylene carbonate at the desired operating temperature. It is preferred that the inert solvent have a dielectric constant of 25 or above since, in general, selectivity for carbon dioxide over methane and the heavier hydrocarbons increases with increasing dielectric constant. Propylene carbonate is the preferred solvent in view of the fact that it also has selective solubility for carbon dioxide. Other suitable solvents for ethylene carbonate which may be used in the process of this invention are water, methyl alcohol, ethyl alcohol, acetone, acetonitrile, levulinaldehyde, lactronitrile, ethylene cyanohydrin, $\alpha$-butyrolactone, N-methylmorpholine, N-ethylmorpholine, ethylene formate, dimethyl sulfate, and nitromethane.

I have found that mixtures of propylene carbonate and ethylene carbonate containing 50 to 80% by volume of ethylene carbonate and 20 to 50% by volume of proplene carbonate have sufficiently low melting points and sufficiently high selectives and capacities to be suitable for use in economically removing carbon dioxide from natural gas consisting predominantly of ethane and heavier hydrocarbons. The concentrations of the ethylene carbonate should be as high as possible, while assuring its complete solubility in the propylene carbonate at the desired operating temperature, in order to achieve maximum rejection of ethane and heavier hydrocarbons. Propylene carbonate concentrations of 20 to 40% by volume and ethylene carbonate concentrations of 60 to 80% by volume are preferred. For example, a mixture consisting of about 77% by volume of ethylene carbonate and 23% by volume of propylene carbonate is a single phase liquid at temperatures as low as 15° C.

The capacity and selectivity of propylene carbonate for removing carbon dioxide from methane was compared experimentally with the capacity and selectiveity of a mixture of 77% by volume of ethylene carbonate and 23% by volume of propylene carbonate. The results of this comparison are shown in Table I

| Solvent | Solubility, $\alpha^1$ | | Selectivity, $\alpha CO_2/\alpha CH_4$ |
|---|---|---|---|
| | $CO_2$ | $CH_4$ | |
| Propylene carbonate | 3.11 | 0.101 | 31.0 |
| 77% by vol. ethylene carbonate and 23% by vol. propylene carbonate mixture | 2.68 | 0.092 | 29.1 |

[1] $\alpha$ The Bunsen absorption coefficient, is defined as the number of milliliters of gas, measured at 0° C. and 760 mm. of Hg, which dissolve in 1 milliliter of solvent at the temperature of the experiment (25° C. in these tests), when the partial pressure of the gas above the solvent is one atmosphere.

This comparison shows that the selectiveity for extracting carbon dioxide from methane of the ethylene carbonate-propylene carbonate solvent mixture is only slightly less than that of the propylene carbonate, while the capacity of the mixture for carbon dioxide is only about 13% less than the capacity of the propylene carbonate. However, the selective solvent of this invention is superior to propylene carbonate in ability to reject ethane and heavier hydrocarbons. This was demonstrated experimentally using propane and butane as representative of heavier hydrocarbons, with the results shown in Table II.

Table II

| Solvent | Solubility, $\alpha$, at 80° F. | | | | Selectivity, $\alpha CO_2/\alpha C_3H_8$ |
|---|---|---|---|---|---|
| | $CO_2$ | $CH_4$ | $C_3H_8$ | $C_4H_{10}$ | |
| 70% by wt. ethylene carbonate and 30% by wt. propylene carbonate mixture | 3.07 | .001 | .94 | 2.25 | 3.27 |
| 70% by wt. ethylene carbonate and 30% by wt. nitromethane mixture | 3.25 | .102 | 1.14 | 2.36 | 2.85 |
| Propylene carbonate | 3.36 | | 1.75 | | 1.92 |

The superiority of solvents consisting primarily of ethylene carbonate will be apparent from the $CO_2/C_3H_8$ selectivity values given.

In general, this invention contemplates the removal of acid gases from gaseous mixtures containing same by treatment with a selective solvent consisting essentially of ethylene carbonate. In addition to the treatment of natural gas containing carbon dioxide, the process of this invention is applicable to the treatment of any acid-gas-containing gaseous mixture as long as the solvent has a capacity for the acid gas and a selectivity for extracting same from the gaseous mixture. For example, the solvent of this invention can be used for removing carbon dioxide from flue gas or hydrogen.

The process of this invention is carried out using conventional absorption procedures wherein the gaseous mixture is contacted with the selective solvent of this invention in either batchwise or countercurrent treatment. Succession batchwise extractions also can be used. In the preferred method of practicing the invention, the gaseous mixture to be treated is contacted in a countercurrent absorption tower with the solvent in a continuous flow method. The spent solvent is continuously withdraw from the absorption tower and is introduced into a flash chamber and/or air-stripping column to remove the absorbed gases. The regenerated solvent is then recycled to the absorption tower where it is used again.

The extraction procedure may be varied by adding a small quantity of water to the solvent to get maximum selectivity towards the acid gas. The addition of water to the solvent increases the selectivity of the solvent for acid gas while decreasing its capacity since water has an excellent selectivity for acid gas but a very low capacity. In general, between about 1 to 10 volume percent of water can be used in the solvent of this invention.

The extraction process is preferably carried out at temperatures within the range of about 40° to 100° F., although higher and lower temperatures may be utilized. It will be evident that the minimum temperature at which any specific solvent can be used is the minimum temperature at which the composition is a liquid. Pressures from about 200 to 2,000 p.s.i.g. may be used.

In order to illustrate the invention, a gas mixture consisting of 25% carbon dioxide, 69% methane, and 6% ethane is introduced into the bottom of an absorption tower at a temperature of 15° F. A solvent consisting of 50% by volume of ethylene carbonate and 50% by volume of propylene carbonate is pumped into the top of the absorption tower at a temperature of 0° F. and a rate of 25 gallons/m.s.c.f. of entering gas. The solvent is warmed to 50° F. (heat of absorption) as it proceeds down the tower contacting the gas feed counter-currently. The gas feed, which is withdrawn from the top of the tower, is scrubbed to a composition of 2% carbon dioxide, 92% methane, and 6% ethane. The rich absorbent containing 10.0 s.c.f./gallon of carbon dioxide, 0.8 s.c.f./gallon of ethane, and 1.0 s.c.f./gallon of methane is withdrawn from the absorption tower and then flashed and stripped of its carbon dioxide and hydrocarbon content. Approximately 3.6% of the methane and 40% of the ethane are lost with the evolved carbon dioxide.

When a gas mixture having the same composition is treated under the same conditions with a solvent consisting soley of propylene carbonate, 5% of the methane and 60% of the ethane are lost with the evolved carbon dioxide. In addition, facilities for recovery of the ethane need be larger using an absorbent consisting soley of propylene carbonate, whereas the mixture of 50% by volume of ethylene carbonate and 50% by volume of propylene carbonate shows selectivity not only in absorption, but also in subsequent recovery operations.

The embodiments of this invention in which an exclusive property or privilege are claimed are defined as follows:

1. A process for the removal of carbon dioxide from a gaseous mixture containing carbon dioxide and ethane and heavier hydrocarbons which comprises contacting said gaseous mixture with a solution of ethylene carbonate in an inert solvent, and preferentially absorbing carbon dioxide in said solution, and separating the unabsorbed components of said gaseous mixture, including ethane and heavier hydrocarbons, from said solution.

2. A process according to claim 1 in which said solvent is propylene carbonate and said contacting is carried out at a temperature above 36.2° C.

3. A process according to claim 1 in which said solvent is a solvent selective for carbon dioxide.

4. A process according to claim 3 in which said solvent has a dielectric constant of at least 25.

5. A process according to claim 3 in which the amount of said solvent is not substantially greater than that required to assure the complete solubility of said ethylene carbonate at the temperature at which said contacting is carried out.

6. A process according to claim 1 in which the solution contains 50 to 80% by vol. of ethylene carbonate and 20 to 50% by vol. of propylene carbonate.

7. A process according to claim 3 in which said contacting is carried out at a temperature from about 40° to 100° F. and a pressure between 200 and 2,000 p.s.i.g.

8. A process for the removal of carbon dioxide from a natural gas containing carbon dioxide and ethane and heavier hydrocarbons which comprises contacting said natural gas at a temperature of about 40° to 100° F. and a pressure of about 200 to 2,000 p.s.i.g. with a solution of ethylene carbonate in an inert liquid, preferentially absorbing carbon dioxide in said solution, and separating the unabsorbed components of said natural gas, including ethane and heavier hydrocarbons from said solution.

9. In a process for removing carbon dioxide from a gaseous mixture containing carbon dioxide and ethane and heavier hydrocarbons by contacting said gaseous mixture with propylene carbonate and preferentially absorbing carbon dioxide in said propylene carbonate, and separating the unabsorbed components of said gaseous mixture, including ethane and heavier hydrocarbons, from said propylene carbonate, the improvement which comprises contacting said gaseous mixture with propylene carbonate admixed with ethylene carbonate in an amount sufficient to enhance the ability of said propylene carbonate to reject ethane and heavier hydrocarbons.

References Cited by the Examiner

UNITED STATES PATENTS

| | | | |
|---|---|---|---|
| 2,373,951 | 4/45 | Evans et al. | 252—364 X |
| 2,688,645 | 9/54 | Badertscher et al. | |
| 2,837,585 | 6/58 | Murray et al. | |
| 2,849,396 | 8/58 | Nelson | 252—364 X |
| 2,894,957 | 7/59 | Anderson et al. | 260—340.2 |
| 2,924,608 | 2/60 | Mills | 260—340.2 |
| 2,926,751 | 3/60 | Kohl et al. | 55—68 X |
| 2,943,703 | 7/60 | Thayer | 55—65 X |
| 3,018,228 | 1/62 | Cornell | 202—39.5 |

FOREIGN PATENTS 728,444  4/55  Great Britain.

REUBEN FRIEDMAN, *Primary Examiner.*

HERBERT L. MARTIN, GEORGE D. MITCHELL,
*Examiners.*